US011718550B2

(12) United States Patent
Bursztein et al.

(10) Patent No.: US 11,718,550 B2
(45) Date of Patent: Aug. 8, 2023

(54) CARTRIDGE FOR WATER TREATMENT FOR A DEVICE FOR WATER TREATMENT, A HEAD OF A DEVICE FOR WATER TREATMENT AND A DEVICE FOR WATER TREATMENT COMPRISING SUCH A CARTRIDGE AND SUCH A HEAD

(71) Applicant: FORMASTER S.A., Kielce (PL)

(72) Inventors: Maciej Bursztein, Maslow (PL); Bogdan Frankowicz, Kielce (PL)

(73) Assignee: FORMASTER S.A., Kielce (PL)

( * ) Notice: Subject to any disclaimer, the term of this patent is extended or adjusted under 35 U.S.C. 154(b) by 689 days.

(21) Appl. No.: 16/640,453

(22) PCT Filed: Aug. 9, 2018

(86) PCT No.: PCT/IB2018/056002
§ 371 (c)(1),
(2) Date: Feb. 20, 2020

(87) PCT Pub. No.: WO2019/038622
PCT Pub. Date: Feb. 28, 2019

(65) Prior Publication Data
US 2020/0207652 A1   Jul. 2, 2020

(30) Foreign Application Priority Data

Aug. 23, 2017 (PL) .......................... 422621

(51) Int. Cl.
*C02F 9/20* (2023.01)
*B01D 27/14* (2006.01)
(Continued)

(52) U.S. Cl.
CPC .............. *C02F 9/20* (2023.01); *B01D 27/148* (2013.01); *C02F 1/003* (2013.01); *C02F 1/42* (2013.01);
(Continued)

(58) Field of Classification Search
None
See application file for complete search history.

(56) References Cited

U.S. PATENT DOCUMENTS

| 6,027,644 A | 2/2000 | Magnusson | |
| 2005/0067342 A1* | 3/2005 | Bassett | B01D 35/147 210/418 |

(Continued)

FOREIGN PATENT DOCUMENTS

| EP | 1824577 A1 | 8/2007 |
| KR | 20040037823 A | 5/2004 |

(Continued)

*Primary Examiner* — Hayden Brewster
(74) *Attorney, Agent, or Firm* — Browdy and Neimark, PLLC

(57) ABSTRACT

A water-treatment cartridge (3) for a water-treatment device, wherein the water-treatment device comprises a head with a port for feeding water for treatment to the cartridge and a port for discharging water from the cartridge (3) after treatment. The water-treatment cartridge (3) according to the invention comprises an inlet channel for feeding water for treatment to the cartridge (3) for making a fluid communication with the port of the head for feeding water for treatment to the water-treatment cartridge (3), and an outlet channel for discharging water after treatment from the water- treatment cartridge (3) for making a fluid communication with the port for discharging water after treatment from the water-treatment cartridge (3), at least one water-treatment bed, which the at least one water-treatment bed is in a fluid communication with the inlet channel for feeding water for treatment and with the outlet channel for discharging water after treatment. The water-treatment cartridge (3) is characterized in that it comprises orientating means (10) configured to make a flow of water for treatment from the port of the head for feeding water for treatment with the inlet channel, when the water-treatment cartridge (3) is installed (Continued)

in the head of the water-treatment device. The invention also relates to a head of a water-treatment device for use with a water-treatment cartridge (3). In addition, the invention relates to a water-treatment device comprising a head and a water-treatment cartridge (3).

20 Claims, 8 Drawing Sheets

(51) Int. Cl.
  *C02F 1/00* (2023.01)
  *C02F 1/42* (2023.01)
  *C02F 1/66* (2023.01)
  *C02F 1/68* (2023.01)

(52) U.S. Cl.
  CPC .................. *C02F 1/66* (2013.01); *C02F 1/68* (2013.01); *B01D 2201/303* (2013.01); *C02F 2201/004* (2013.01); *C02F 2201/006* (2013.01); *C02F 2301/043* (2013.01); *C02F 2307/10* (2013.01)

(56) References Cited

U.S. PATENT DOCUMENTS

| | | |
|---|---|---|
| 2006/0091047 A1 | 5/2006 | Ye |
| 2014/0027361 A1 | 1/2014 | Pennington |
| 2015/0321926 A1* | 11/2015 | McGibbon .............. C02F 1/283 210/287 |

FOREIGN PATENT DOCUMENTS

| | | |
|---|---|---|
| KR | 20160022709 A | 3/2016 |
| WO | 2014004607 A1 | 1/2014 |

* cited by examiner

CARTRIDGE FOR WATER TREATMENT FOR A DEVICE FOR WATER TREATMENT, A HEAD OF A DEVICE FOR WATER TREATMENT AND A DEVICE FOR WATER TREATMENT COMPRISING SUCH A CARTRIDGE AND SUCH A HEAD

FIELD OF THE INVENTION

The present invention substantially relates to water treatment, in particular, domestic treatment of tap water. More specifically, the present invention relates to a water-treatment cartridge for a water-treatment device. Furthermore, the present invention relates to a head of the water-treatment device. The present invention relates to a water-treatment device comprising such a cartridge and such a head.

BACKGROUND OF THE INVENTION

There are known domestic water-treatment devices, especially for tap water, comprising a head with a water-treatment cartridge situated therein. A water-treatment cartridge of such a solutions is usually a filtering cartridge. Less frequently, a water-treatment cartridge is a cartridge for controlling water hardness, a cartridge for controlling water pH, a cartridge for enriching water with a desired substance, for example, with desired ions, such as calcium, magnesium ions, and a cartridge for biological treatment.

In these solutions the water-treatment cartridge gradually wears out. That is, the filtering cartridge becomes clogged, the cartridge for controlling water pH loses its pH controlling properties, the cartridge for enriching water wears out and no longer introduces the desired substances into water, and the cartridge for biological treatment no longer changes the biological purity of the treated water. In such a situation the water-treatment cartridge needs replacing.

In known domestic tap water treatment devices replacement of a water-treatment cartridge usually consists in screwing a worn water-treatment out of the head of the device and screwing a new water-treatment cartridge in its place. Domestic water-treatment devices with a water-treatment cartridge, usually with a water-filtering cartridge, are usually installed in the kitchen, in the under-sink cabinet, wherein water after treatment is draw from a small tap mounted on the kitchen sink. Therefore, access to the device is usually significantly limited and makes installation or replacement of the cartridge difficult.

Therefore, there is a demand for a water-treatment device with a water-treatment cartridge, providing quick, easy, precise and pleasant installation or replacement of the water-treatment cartridge.

SUMMARY OF THE INVENTION

Thus, in the first aspect of the present invention, a water-treatment cartridge is provided. The water-treatment cartridge according to the invention to a water treatment device comprising a head comprising a port for feeding water for treatment to the cartridge and a port for discharging water from the cartridge after treatment. The water-treatment cartridge comprises an inlet channel for feeding water for treatment to the cartridge for making a fluid communication with the port of the head for feeding water for treatment to the water-treatment cartridge, and an outlet channel for discharging water after treatment from the water-treatment cartridge for making a fluid communication with the port for discharging water after treatment from the water-treatment cartridge, at least one water-treatment bed, which the at least one water-treatment bed is in fluid communication with the inlet channel for feeding water for treatment and with the outlet channel for discharging water after treatment. The water-treatment cartridge is characterized in that it comprises orientating means adapted for making a flow of water for treatment from the port of the head for feeding water for treatment with the inlet channel when the water-treatment cartridge is installed in the head of the water-treatment device.

Preferably, the inlet channel and the outlet channel are arranged on the neck of the body of the water-treatment cartridge.

Preferably, the outlet channel is arranged on the face of the neck of the body, while the inlet channel is arranged on the side of the neck of the body of the water-treatment cartridge.

Preferably, the water-treatment cartridge comprises one water-treatment bed.

Preferably, the water-treatment cartridge comprises a first bed for the first treatment of water and a second bed for the second treatment of water, wherein the first bed is in fluid communication with the inlet channel for feeding water for treatment, while the second bed is in fluid communication with the first bed for the first treatment of water and the outlet channel for discharging water after treatment.

Preferably, the water-treatment beds are selected independently from a filtering bed, a water hardness adjustment bed, a water-enrichment bed, a water pH adjustment bed and a biological treatment bed.

Preferably, for making a flow of water for treatment into the water-treatment cartridge through the inlet channel of the head of the water-treatment device, the orientating means are adapted for cooperating with the determining means on the head of the water-treatment device.

Preferably, the orientating means is a protrusion arranged radially near the neck of the water-treatment cartridge for cooperating with the determining means in the form of a notch on the head of the water-treatment device.

In another aspect of the present invention, a head for the water-treatment device is provided. The head according to the invention of the water-treatment device for receiving a water-treatment cartridge, which comprises an inlet channel for feeding water for treatment to the cartridge and an outlet channel for discharge water after treatment from the cartridge. The head according to the invention of the water-treatment device comprises a port for feeding water for treatment to the water-treatment cartridge for making a fluid communication with the inlet channel of the water-treatment cartridge and a port for discharge water after treatment from the water-treatment cartridge for making a fluid communication with the outlet channel of the water-treatment cartridge. The head is characterized in that it comprises determining means configured to make a flow of water for treatment from the port of the head for feeding water for treatment with the inlet channel when the water-treatment cartridge is installed in the head of the water-treatment device.

Preferably, the port for feeding water for treatment to the water-treatment cartridge and the port for discharge water after treatment from the water-treatment cartridge are arranged in the seat of the head of the water-treatment device.

Preferably, the port for feeding water for treatment to the water-treatment cartridge is arranged on the side of the seat of the head, whereas the port for discharging water after treatment from the water-treatment cartridge is arranged at the bottom of the seat.

Preferably, for making a flow of water for treatment through the inlet channel of the water-treatment cartridge in the head of the water-treatment device, the determining means of the head are configured to cooperate with the orientating means on the water-treatment cartridge.

Preferably, the determining means is a notch in the head of the water-treatment device for cooperation with the orientating means on the water-treatment cartridge in the form of a protrusion arranged radially near the neck of the water-treatment cartridge.

In yet another aspect of the present invention, a water-treatment device is provided.

The device according to the invention for water treatment comprises a head comprising a port for feeding water for treatment and a port for discharging water after treatment, a water-treatment cartridge comprising a first inlet channel for feeding water for treatment to the cartridge in a fluid communication with the port of the head for feeding water for treatment to the water-treatment cartridge, and an outlet channel for discharging water after treatment from the cartridge in a fluid communication with the port for discharging water after treatment from the water-treatment cartridge, at least one water-treatment bed, wherein the at least one water-treatment bed is in a fluid communication with the inlet channel for feeding water for treatment and with the outlet channel for discharging water after treatment. The water-treatment device is characterized in that the water-treatment cartridge comprises orientating means, while the head comprises determining means adapted for making a flow of water through the inlet channel when the water-treatment cartridge is installed in the head of the water-treatment device.

Preferably, the port for feeding water for treatment and the port for discharging water after treatment from the water-treatment cartridge of the water-treatment device are arranged in the seat of the head of the device, while the inlet channel and the outlet channel are situated on the neck of the body of the water-treatment device.

Preferably, the port for feeding water for treatment of the cartridge of the water-treatment device is arranged on the side of the seat, while the port for discharging water after treatment is arranged at the bottom of the seat, and the outlet channel is arranged on the face of the neck, while the inlet channel is arranged on the side of the neck of the body of water-treatment cartridge.

Preferably, the water-treatment cartridge comprises one water-treatment bed.

Preferably, the water-treatment cartridge of the water-treatment device comprises a first bed for the first treatment of water and a second bed for the second treatment of water, wherein the first bed is in a fluid communication with the inlet channel for feeding water for treatment, while the second bed is in a fluid communication with the first bed for the first treatment of water and the outlet channel for discharging water after treatment.

Preferably, the water-treatment beds are selected independently from a filtering bed, a water hardness adjustment bed, a water-enrichment bed, a water pH adjustment bed and a biological treatment bed.

Preferably, the first water-treatment bed is a water-hardness adjustment bed, while the second water-treatment bed is a filtering bed.

Preferably, for making a flow of water for treatment through the inlet channel of the water-treatment cartridge in the head of the water-treatment device, the orientating means of the water-treatment cartridge are configured to cooperate with the determining means of the head of the water-treatment device.

Preferably, the orientating means is a protrusion arranged radially near the neck of the water-treatment cartridge, whereas the determining means on the head is a notch.

The technical solutions according to the above aspects of the present invention thus provide a water-treatment cartridge, a head of a water-treatment device and a water-treatment device comprising such a head and such a cartridge, in which installation or replacement of the water-treatment cartridge is performed quickly, easily and enjoyably by inserting the cartridge into the head of the water-treatment device while possibly rotating the cartridge relatively slightly around its longitudinal axis.

BRIEF DESCRIPTION OF THE FIGURES

The present invention will be now described in more detail with reference to the figures of the drawing, wherein.

DETAILED DESCRIPTION OF THE INVENTION

Figure 3:
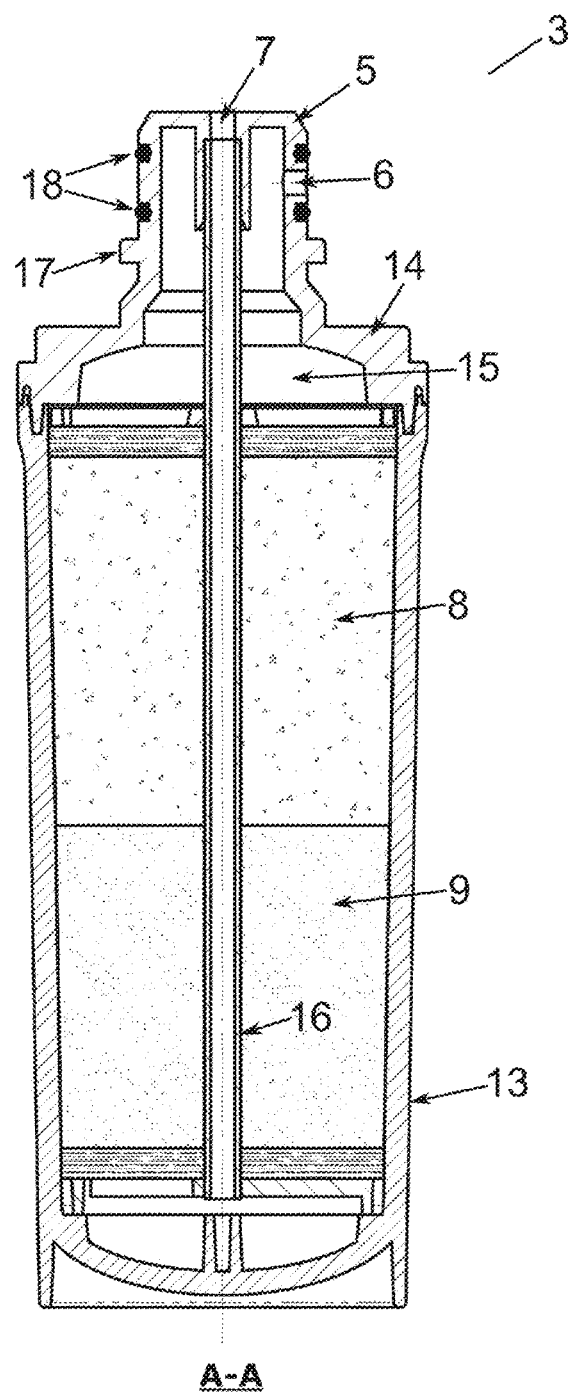
FIG. 3 shows a longitudinal section of another of the preferred embodiments of the water-treatment cartridge along the A-A line of the cartridge of FIG. 1.
Figure 4:
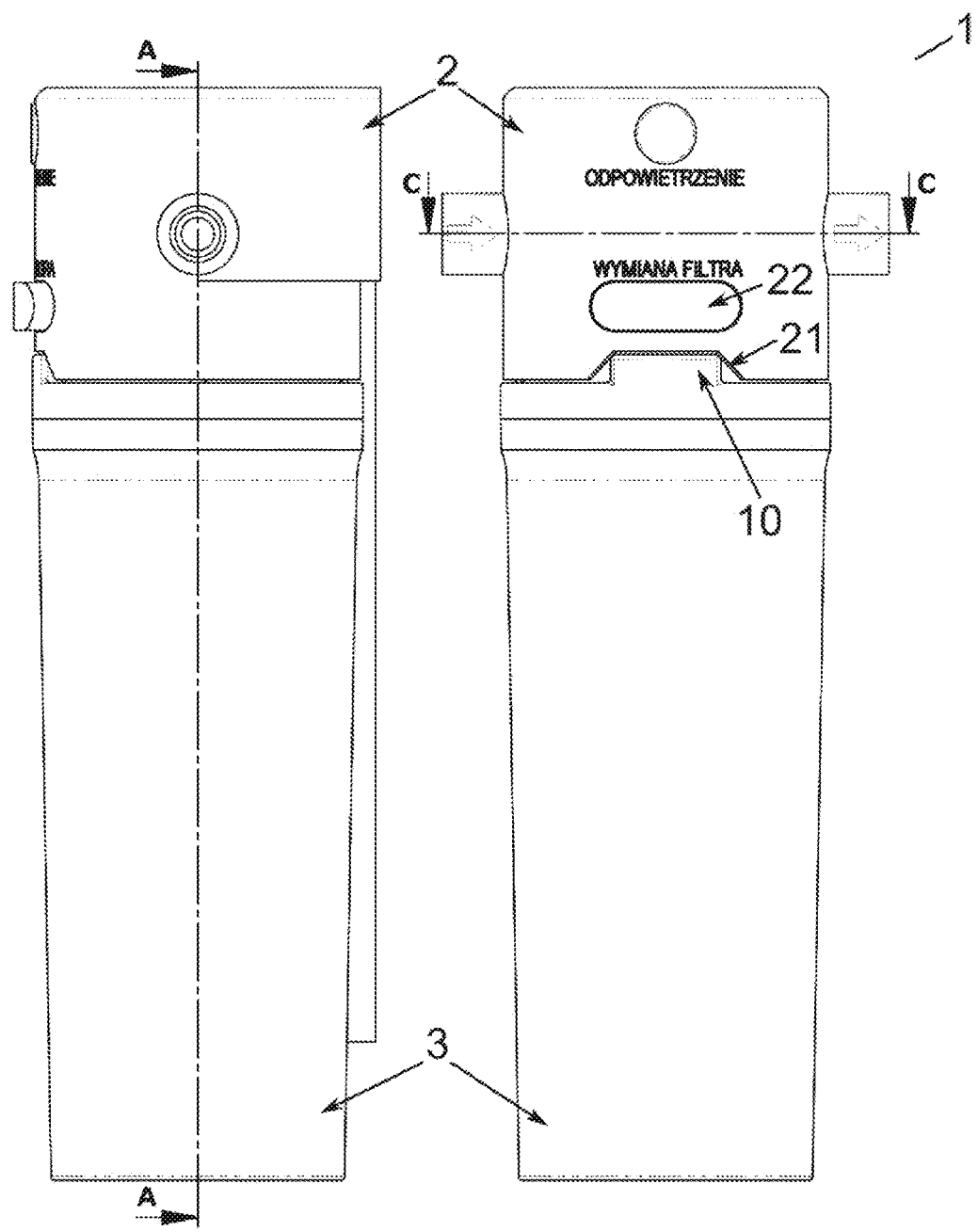
FIG. 4 shows on the left and right, respectively, a side view and a front view of one of the preferred embodiments of the water-treatment device according to the invention.

The present invention provides a water-treatment cartridge 3 for a water-treatment device 1. As shown in FIGS. 3 and 4, the water-treatment cartridge 3 comprises a body comprising a cylindrical part 13, which is closed with a bottom at one of its ends, and a body cap 14 mounted at the second of the ends of the cylindrical part 13. The cylindrical part 13 with the bottom, together with the cap 14, form an inner chamber 15 of the water-treatment cartridge 3.

Figure 1:
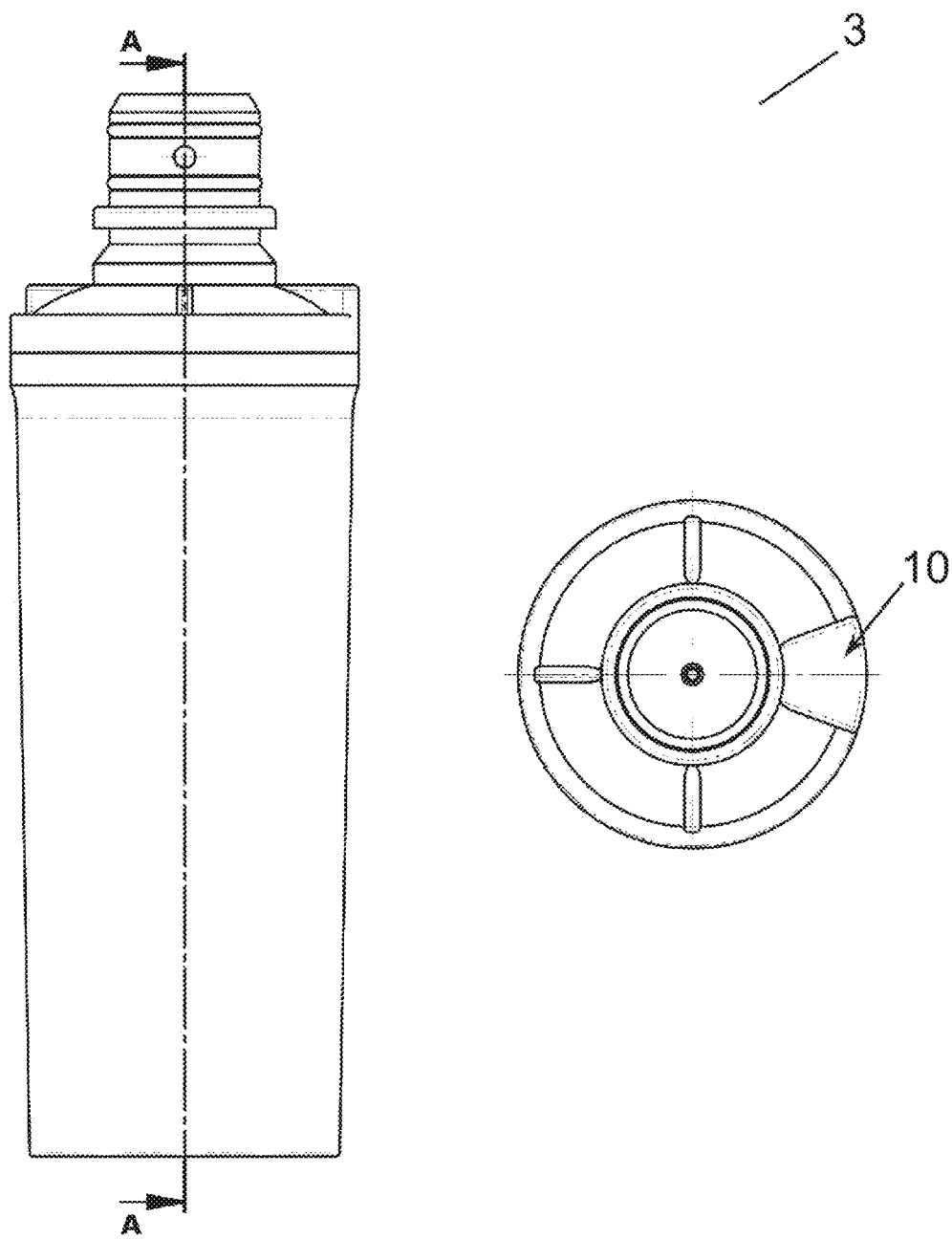
FIG. 1 shows on the left and right, respectively, a side view and a top view of the water-treatment cartridge according to one of the preferred embodiments of the water-treatment cartridge according to the invention.
Figure 2:
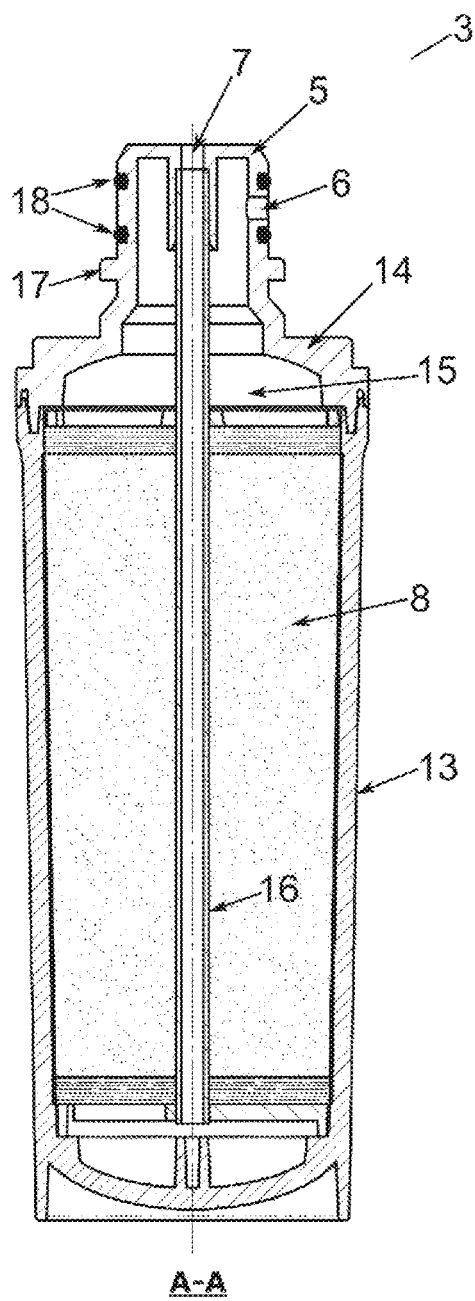
FIG. 2 shows a longitudinal section of one of the preferred embodiments of the water-treatment cartridge along the A-A line of the cartridge of FIG. 1.

As shown in Figures, especially FIGS. 2 and 3, the body cap 14 comprises a neck 5 arranged in the central portion of the body cap 14, which the neck 5 extends outside the body of the water-treatment cartridge 3 and is oriented substantially along the longitudinal axis of the water-treatment cartridge 3. As shown in FIG. 1, the neck 5 has a substantially circular cross-section. The neck 5 comprises an inlet channel 6 for feeding water for treatment to the cartridge 3 and an outlet channel 7 for discharging water after treatment from the cartridge 3. As shown in FIG. 1-3, the inlet channel 6 is arranged on the side wall of the neck 5 of the water-treatment cartridge 3. Moreover, the inlet channel 6 runs directly to the inner chamber 15 immediately downstream the neck 5 of the water-treatment cartridge 3, as shown in FIG. 3. The outlet channel 7 is arranged on the face of the neck 5, that is, on the upper surface of the neck 5 looking at the cartridge from the side of the neck 5 and is arranged substantially in the longitudinal axis of the body of the water-treatment cartridge 3, as shown in FIGS. 1-3.

As shown in Figures, the inlet channel 6 for feeding water for treatment to the cartridge 3 and the outlet channel 7 for discharging water after treatment from the water-treatment cartridge 3 each have a circular cross-section. In other embodiments, the inlet channel 6 and the outlet channel 7 have, independently, a cross-section selected from a group including a circular, oval, triangular, square, rectangular, pentagonal, hexagonal or any polygonal cross-section. In yet another preferred embodiment at least one of the inlet channel 6 and the outlet channel 7 comprises at least one partition which divides channels 6, 7, respectively, into at least two inlet or outlet sub-channels (not shown in figures). In a preferred embodiment both inlet channel 6 and the outlet channel 7 each comprise one partition dividing these channels 6, 7 into two inlet sub-channels and two outlet sub-channels, respectively (not shown in Figures). In yet another preferred embodiment both the inlet channel 6 and the outlet channel 7 each comprise two intersecting partitions dividing these channels 6, 7 into four inlet sub-channels and four outlet sub-channels, respectively (not shown in Figures).

In the inner chamber 15 there is an outlet conduit 16 being in a fluid communication with the outlet channel 7 for discharging water after treatment to the outlet channel 7 on the neck 5 of the water-treatment cartridge 3. As shown in FIGS. 2 and 3, the outlet conduit 16 is arranged substantially in the longitudinal axis of the body of the water-treatment cartridge 3.

In the inner chamber 15 of the water-treatment cartridge 3 there is at least one bed 8, 9 for at least one treatment of water in said cartridge 3.

In one of the preferred embodiments of the invention, in the inner chamber 15 of the water-treatment cartridge 3 there is one water-treatment bed 8. As shown in FIG. 2, the water-treatment bed 8 takes up practically the entire volume of the inner chamber 15 of the water-treatment cartridge 3. In this embodiment, the outlet conduit 16 runs through the entire water-treatment bed 8 such that the inlet to the outlet conduit 16 for discharging water after treatment is arranged on the opposite side of the bed 8 relative to the inlet channel 6 of the water-treatment cartridge 3, as shown in FIG. 2. Thus, the water-treatment cartridge 3 with one bed 8 is a single-function cartridge, that is, the water-treatment cartridge 3 is, depending on the bed 8, but not limited to, a filtering cartridge, a water hardness adjustment cartridge, a water enrichment cartridge, a water pH adjustment cartridge or a biological treatment cartridge, respectively.

In another preferred embodiment of the invention, in the inner chamber 15 of the water-treatment cartridge 3 there are two water-treatment beds 8, 9. As shown in FIG. 3, the beds 8, 9 are arranged in series in the direction of the flow of water through the water-treatment cartridge 3. Thus, the first bed 8 for the first treatment of water is arranged on the side of the water-treatment inlet channel 6 and is in a fluid communication with said inlet channel 6. The second bed 9 for the second treatment of water is arranged downstream the first bed 8 and is in a fluid communication therewith. Moreover, the second bed 9 is in a fluid communication with the outlet conduit 16 such that the inlet of the outlet conduit 16 is on the opposite side relative to the first water-treatment bed 8, as shown in FIG. 3. Thus, the water-treatment cartridge 3 with the two beds 8, 9, constitutes a two-function cartridge. For example, the water-treatment cartridge 3 is a filtering-water pH adjustment cartridge, a filtering-water hardness adjustment cartridge, a filtering-water enrichment cartridge, a filtering-biological treatment cartridge. It should be noted that any combination of two of the beds is possible, including, but not limited to, a filtering bed, a water hardness adjustment bed, a water enrichment bed, a water pH adjustment bed and a biological treatment bed.

In another preferred embodiment of the invention, in the inner chamber 15 of the water-treatment cartridge 3 there are three water-treatment beds (not shown in Figures). In this embodiment, the third bed is situated between the first water-treatment bed 8 and the second water-treatment bed 9 and is in a fluid communication with them, respectively. Thus, the water-treatment cartridge 3 with three beds is a three-function cartridge. For example, the water-treatment cartridge 3 is a filtering-water pH adjustment-water hardness adjustment cartridge, a filtering-water pH adjustment-water hardness adjustment cartridge, a water pH adjustment-filtering-water enrichment cartridge, a water pH adjustments-filtering-biological cartridge, etc. It should be noted that any combination of three beds is possible, including, but not limited to, a filtering bed, a water hardness adjustment bed, a water enrichment bed, a water pH adjustment bed and a biological treatment bed.

In yet another embodiment of the invention, when necessary, the water-treatment cartridge 3 comprises four or more water-treatment beds. The water-treatment beds in a cartridge 3 with four or more beds are arranged similarly, as in the case of the water-treatment cartridge 3 with tree beds, as described above. Thus, a water-treatment cartridge 3 with four or more beds is a four-function cartridge or a multi-function cartridge, respectively. The beds for the water-treatment cartridge 3 with four or more water-treatment beds are selected in any combination from a group comprising, but not limited to, a filtering bed, a water hardness adjustment bed, a water enrichment bed, a water pH adjustment bed and a biological treatment bed.

As mentioned above, water treatment in the water-treatment cartridge 3 according to the present invention is performed in beds. Water-treatment beds are selected from, but not limited to, a filtering bed, a water hardness adjustment bed, a water-enrichment bed, a water pH adjustment bed, a biological water-treatment bed.

The filtering bed used in the water-treatment cartridge 3 according to the present invention is to separate from the water subjected to treatment undesired physical components, such as pollution particles and chemical components, such as, for example, undesired chemical substances dissolved in water. Without limiting oneself to any theory, physical impurities are separated on a filtering bed substantially by means of mechanical separation of impurity particles on the bed, while chemical impurities are separated on a filtering bed substantially by means of absorption. A filtering bed comprises at least one of the materials selected from, but not limited to, fibrous materials, such as, for example, filtering paper, filtering canvas, cotton wool, lignin, absorption materials, such as, for example, activated carbon. In one of the preferred embodiments, the filtering bed is made in the form of a bag made of a filtering material filled with an absorption material powder or a granulate, such as, for example, activated carbon. In yet another of the preferred embodiments of the present invention the filtering bed is made in the form of a block. In the most preferred embodiment of the present invention the filtering bed is a block of activated carbon.

The water hardness adjustment bed used in the water-treatment cartridge 3 according to the present invention is to control the hardness of the water subjected to treatment. In practice, controlling the hardness of water consists in decreasing its hardness, that is, softening it. Controlling the hardness of water consists in ion exchange in the bed. A water hardness adjustment bed contains a material for controlling water hardness in the form of a powder or granulate, but not limited to. The water-hardness adjustment material is selected from, but not limited to, an ion-exchange resin.

The water enrichment bed used in the water-treatment cartridge 3 is to introduce desired substances into the water subjected to treatment. Desired substances introduced into water during its enrichment include, but not limited to, ions, such as, for example, magnesium, calcium ions. A water enrichment bed comprises a material that releases desired substances into the water subjected to treatment, wherein the material is selected from, but not limited to, a material releasing magnesium ions, a material releasing calcium ions. In the most preferred embodiment of the present invention the water enrichment bed is a block releasing magnesium ions.

The pH adjustment bed used in the water-treatment cartridge 3 according to the present invention is to appropriately control the pH of the water subjected to treatment.

The biological treatment bed used in the water-treatment cartridge 3 according to the present invention is to remove undesired biological forms from the water subjected to treatment. Removing undesired biological forms includes, but not limited to, removing viruses, bacteria, fungi, parasites, including their eggs, cysts, endospores, intermediate forms, etc. Biological organisms can be removed physically or chemically.

It will be clear to a specialist that the functions performed by the above-mentioned beds can be combined into a single bed. For example, one can provide a single bed allowing to control the hardness of water and simultaneously enrich it or adjust its pH.

The water-treatment cartridge 3 according to the invention comprises orientating means 10 arranged on the body of the water-treatment cartridge 3. The orientating means 10 of the water-treatment cartridge 2 are arranged on the body relative to the inlet channel 6 in such spatial dependence that when the water-treatment cartridge 3 is installed in the water-treatment device 1, the water-treatment cartridge 3 is arranged in the head 2 of the filtering device 1 in one possible position relative to said head 2 of the water-treatment device 1, which position will be described in more detail below. In a preferred embodiment the orientating means 10 is a protrusion arranged on the cap 14 of the body of the water-treatment cartridge 3. Preferably, the orientating means 10 is a longitudinal protrusion arranged radially on the cap 14 of the water-treatment cartridge 3, as shown in FIG. 1. In other preferred embodiments of the water-treatment cartridge 3 the orientating means 10 are arranged on the neck 5 of the body of the water-treatment cartridge 3 (not shown in Figures). In another preferred embodiment the orientating means 10 is a cavity (not shown in Figures).

The body of the water-treatment cartridge 3 comprises mounting means 17 for mounting the water-treatment cartridge 3 in the head 2 of the water-treatment device 1. The mounting means 17 of the water-treatment cartridge 3 allow to mount the water-treatment cartridge 3 in the head 2 of the water-treatment device 1 such that the cartridge 3 is substantially immovable relative to the head 2 along the longitudinal axis of the water-treatment cartridge 3, but may rotate relative to the head 2 around the longitudinal axis of the water-treatment cartridge 3. In a preferred embodiment of the water-treatment cartridge 3 the mounting means 17 is a protrusion extending on at least a portion of the lateral surface of the neck 5 of the water-treatment cartridge 3. In yet another preferred embodiment of the water-treatment cartridge 3, the mounting means 17 of the water-treatment cartridge 3 is a protrusion in the form of a ring running around the neck 5 of the water-treatment cartridge 3, as shown in FIGS. 1-3.

The body of the water-treatment cartridge 3 comprises sealing means 18 for sealing the connection between the water-treatment cartridge 3 and the head 2 of the water-treatment device 1, following its mounting in said device 1 In a preferred embodiment the sealing means 18 are sealing rings arranged on the neck 5 of the body of the water-treatment cartridge 3. In another preferred embodiment of the water-treatment cartridge 3 the sealing means 18 are two sealing rings on the neck 5 of the body of the water-treatment cartridge 3, wherein one of them is arranged on one side relative to the inlet channel 6 for feeding water to the cartridge 3, while the other one of them is arranged on the opposite side of the inlet channel 6 for feeding water to the cartridge 3, as shown in FIGS. 1-3.

The water-treatment cartridge 3 according to the invention is a replacement cartridge. In a preferred embodiment the water-treatment cartridge 3 is a disposable cartridge, which is removed from the water-treatment device 1 and thrown away or disposed of and replaced by a new water-treatment cartridge 3. In another preferred embodiment the water-treatment cartridge 3 is a multiple-use cartridge, which is removed from the water-treatment device 1 and reconditioned for further use in the water-treatment device 1.

Figure 5:
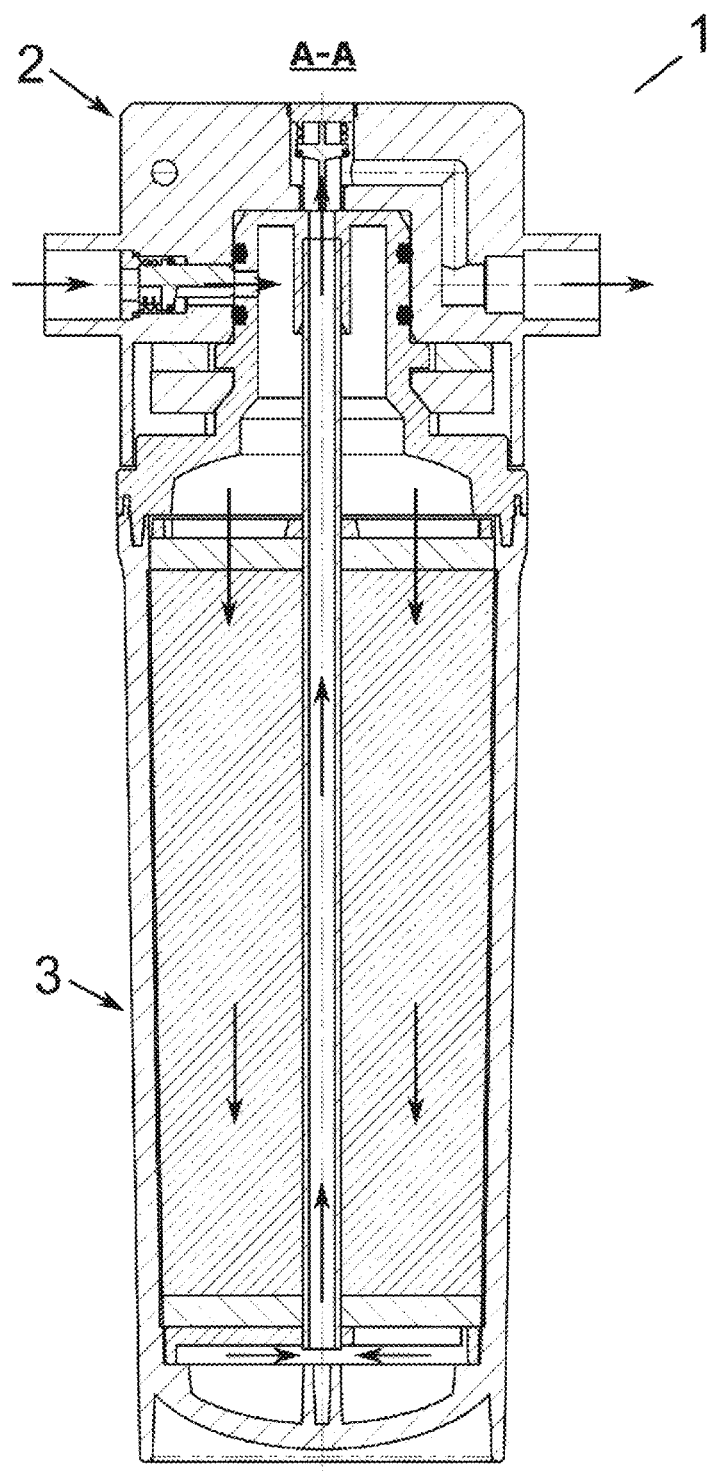
FIG. 5 shows a longitudinal section of the water-treatment device according to the invention of FIG. 4, along the A-A line.

Furthermore, the present invention provides a water-treatment device 1. The water-treatment device 1 comprises a head 2 and a water-treatment cartridge 3 according to the present invention, where the cartridge 3 is arranged in the head 2. The head 2 according to the invention comprises a seat 4 in which the neck 5 of the water-treatment cartridge 3 is arranged. The seat 4 of the head 2 comprises a recess having a substantially circular cross-section, whose shape corresponds with the shape of the neck 5 of the water-treatment cartridge 3, as shown in FIG. 5.

Figure 6:
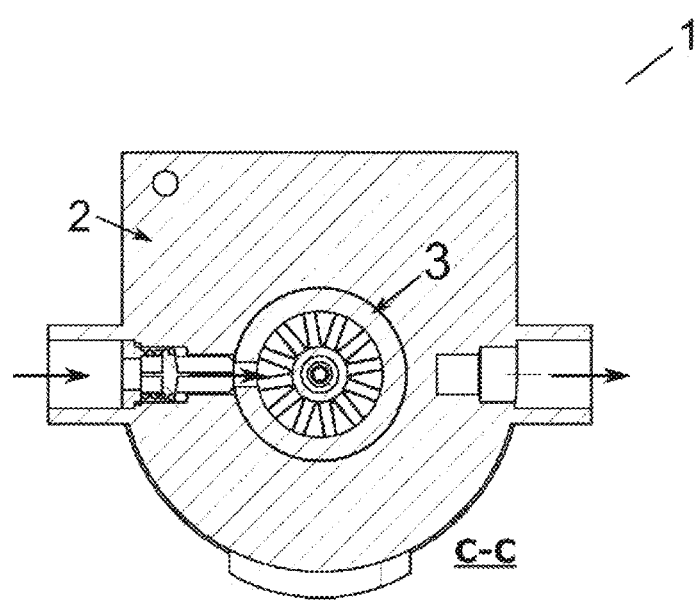
FIG. 6 shows a cross-section of the water-treatment device according to the invention of FIG. 4, along the C-C line.
Figure 7:
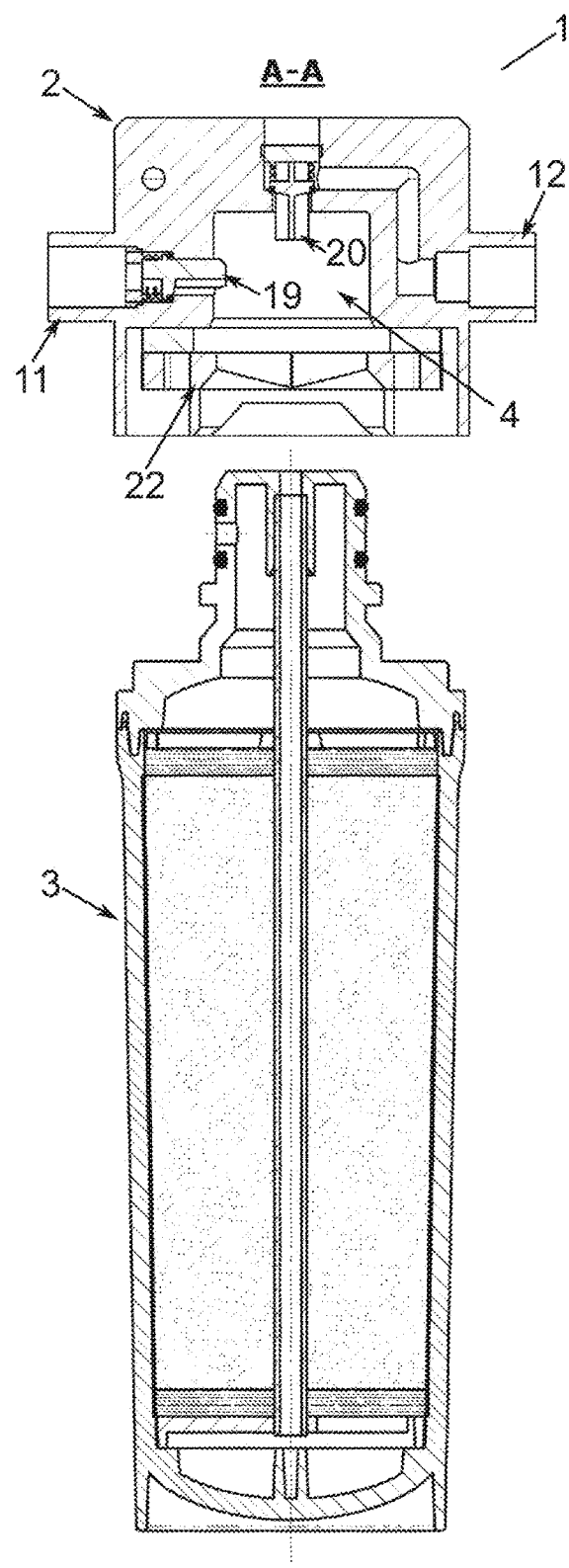
FIG. 7 shows a longitudinal section of the water-treatment device according to the invention of FIG. 5, with the water-treatment cartridge removed from the head of the water-treatment device.

The head 2 of the water-treatment device 1 comprises a port 11 for feeding water for treatment to the water-treatment cartridge 3. The port 11 of the head 2 is on one side connected to the water-supply network for feeding tap water for treatment to the head 2 of the water-treatment device 1. The port 11 for feeding water for treatment is arranged on the side wall of the seat 4 and forms at the other end a fluid communication with the inlet channel 6 of the water-treatment cartridge 3, when installed in the device 1, as shown in FIGS. 5 and 6. In a preferred embodiment of the water-treatment device 1, the port 11 for feeding water for treatment comprises termination means 19 for terminating the flow of water from the water-supply network, when the water-treatment cartridge 3 is removed from the head 2 of the water-treatment device 1. In a preferred embodiment of the water-treatment device 1, the terminating means 19 of the port 11 for feeding water is a check valve. In a preferred embodiment of the water-treatment cartridge 3 comprising at least one partition arranged in the inlet channel 6, as described above, such at least one partition cooperates, when the water-treatment cartridge 3 is installed in the head 2, with the terminating means 19 of the port 11 such that these terminating means 19 are fully open, improving thus the flow of water for treatment into the cartridge 3.

The head 2 of the water-treatment device 1 comprises a port 12 for discharging water after treatment from the water-treatment cartridge 3. The port 12 of the head 2 of the water-treatment device 1 is on one side connected to the system for discharging water after its treatment from the head 2 of the device 1 for the purpose of using the water. Preferably, the collection system is a domestic water-supply network or a terminal for taking water after treatment. The port 12 for discharging water after treatment is arranged at the bottom of the seat 4 and forms, at the other end, a fluid communication with the outlet channel 7 for discharging water from the water-treatment cartridge 3, when installed as shown in FIG. 5. In a preferred embodiment of the water-treatment device 1, the port 12 for discharging water after treatment comprises terminating means 20 for terminating the water evacuating from the plumbing system downstream the head 2 of the water-treatment device 1, when the water-treatment cartridge 3 is removed from the head 2 of said device 1. In a preferred embodiment of the water-treatment device 1, the terminating means 20 is a check valve. In a preferred embodiment of the water-treatment cartridge 3 comprising at least one partition arranged in the outlet channel 7, as described above, such at least one partition cooperates, when the water-treatment cartridge 3 is installed in the head 2, with the terminating means 20 of the port 12 such that these terminating means 20 are fully open, improving thus the discharge of water after treatment from the cartridge 3.

Figure 8:
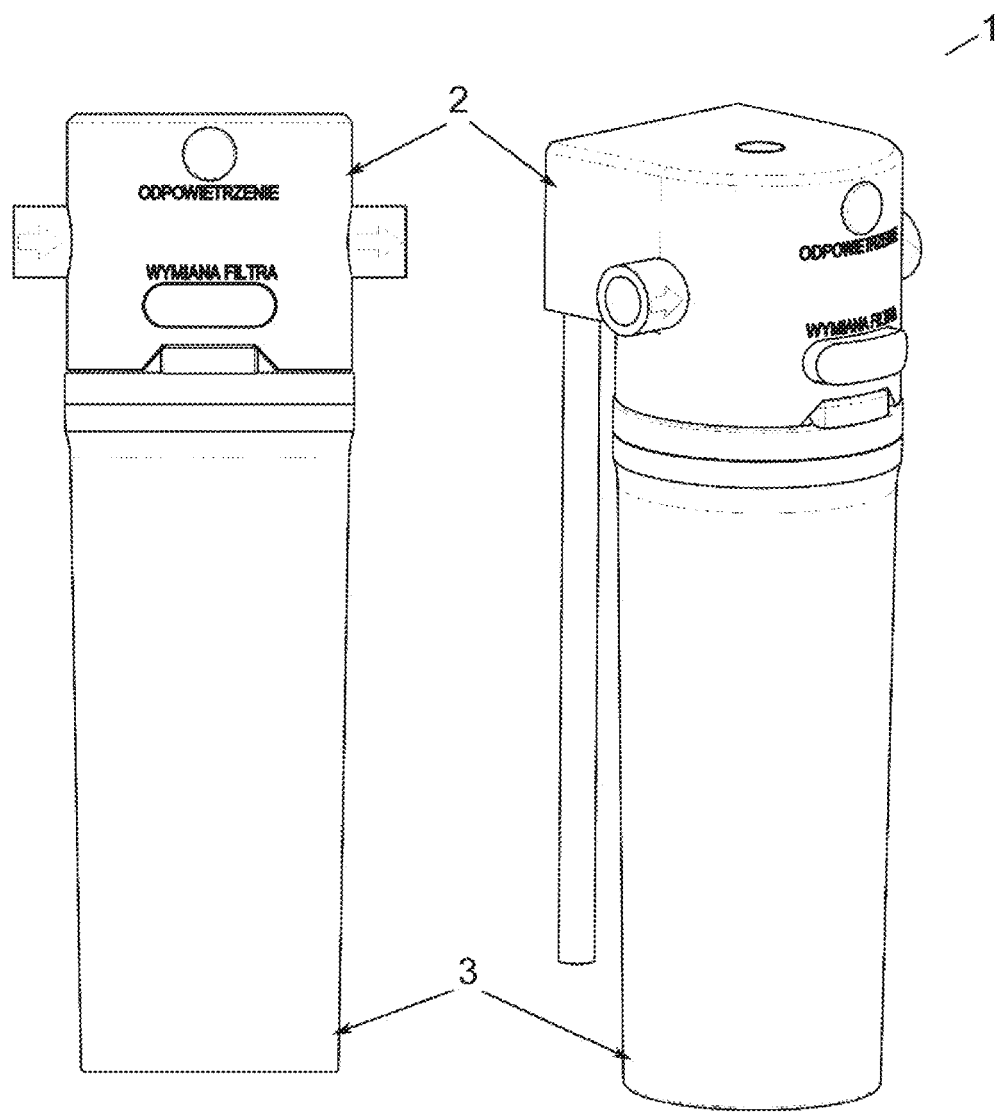
FIG. 8 shows the assembled device according to the invention, comprising the head and the water-treatment cartridge according to the invention.

The head 2 of the water-treatment device 1 comprises determining means 21. The determining means 21 cooperate with the orientating means 10 on the body of the water-treatment device 3 and define one possible spatial position in which the water-treatment cartridge 3 is arranged in the head 2 of the water-treatment device 1, as it will be described in more detail further below. In a preferred embodiment the determining means 21 constitute a notch in the head 2 of the water-treatment device, as shown in FIGS. 4 and 8.

The head 2 of the water-treatment device 1 comprises a mounting mechanism for mounting the water-treatment cartridge 3 in the head 2 of the water-treatment device 1 such that the water-treatment cartridge 3 is substantially translationally immovable in the axial direction of the cartridge 3 relative to the seat 4 of the head 2 of the water-treatment device 1, but allows the cartridge 3 to rotate relative to the head 2. The mounting mechanism of the head 2 of the water-treatment device 1 comprises coupling means 22 arranged inside or near the seat 4 of the head 2 of the water-treatment device 1, which engage with the mounting means 17 of the water-treatment cartridge 3 during and after the mounting of the cartridge 3 in the head 2 of the water-treatment device 1. The coupling means 22 of the mounting mechanism of the head 2 are connected with the releasing means 23 for releasing the coupling means 22 in order to release the water-treatment cartridge 3 for its removal from the head 2 of the water-treatment device 1. In a preferred embodiment of the water-treatment device 1 the coupling means 22 of the head 2 comprise at least one snap element arranged in the seat 4 of the head 2 of the water-treatment device 1, which snaps onto the protrusion arranged on the neck 5 of the water-treatment cartridge 3, as shown in FIG. 5. In a preferred embodiment of the water-treatment device 1, the releasing means 23 is a cartridge replacement button arranged on the head 2 of the device 1, as shown in FIGS. 4 and 8, which is coupled with at least one snap element for manual releasing of the water-treatment cartridge 3 by the user by means of pressing the button with a finger.

The head 2 of the water-treatment device 1 comprises a venting system for venting the water-treatment cartridge 3. In a preferred embodiment of the water-treatment device 1 the venting system comprises a venting channel in a fluid communication with the water-treatment cartridge 3 for venting air from said cartridge, a venting button for initiating and performing the venting of the cartridge 3, wherein said button is in a fluid communication with the venting channel, and a venting conduit in a fluid communication with the venting channel, wherein the venting conduit is directed along the water-treatment cartridge 3, as shown in FIG. 8.

The water-treatment cartridge 3 according to the invention is arranged in the head 2 of the water-treatment device 1 such that the neck 5 of the water-treatment cartridge 3 is inserted into the seat 4 of the head 2 of the water-treatment device 1. During inserting the neck 5 into the seat 4 the mounting means 17 of the water-treatment cartridge 3 engage with the coupling means 22 of the mounting mechanism of the head 2 of the water-treatment device 1.

Simultaneously, during introducing the water-treatment cartridge 3 into the head 2, the orientating means 10 on the body of the water-treatment cartridge 3 engage with the determining means 21 on the head 2 of the water-treatment device 1 positioning the cartridge 3 in one possible position relative to the head 2 of the device 1, in which the inlet channel 6 of the water-treatment cartridge 3 is in a fluid communication with the port 11 for feeding water for treatment to the head 2 of the treatment device 1 and, simultaneously, the outlet channel 7 of the water-treatment cartridge 3 is in a fluid communication with the port 12 for discharging water after treatment from the head 2 of the device 1, in which the inlet channel 6 of the water-treatment cartridge 3 is in a fluid communication with the port 11 for feeding water to the head 2 of the water-treatment device 1 and, simultaneously, the outlet channel 7 of the water-treatment cartridge 3 is in a fluid communication with the port 12 for discharging water after treatment from the head 2 of the device 1, as shown in FIGS. 5 and 6.

In the embodiment, wherein the orientating means 10 on the water-treatment cartridge 3 is an elongated protrusion and the determining means 21 on the head 2 of the water-treatment device 1 is a notch or vice versa, that is, in the embodiment where the orientating means 10 on the water-treatment cartridge 3 is a longitudinal notch and the determining means 21 on the head 2 of the water-treatment device 1 is a protrusion, the engaging of the orientating means 10 with the determining means 21 consists in introducing the protrusion into the notch, respectively, as shown in FIGS. 4 and 8.

In a preferred embodiment of the head 2 of the water-treatment device 1, comprising the terminating means 19, 20, while placing the water-treatment cartridge 3 in the head 2 of the device 1, the terminating means 19 of the port 11 of the head 2 of the water-treatment device 1 are unlocked unlocking the fluid communication for the water to be fed for treatment to the water-treatment cartridge 3 and the terminating means 20 of port 12 of the head 2 of the water-treatment device 1 are unlocked unlocking the fluid communication for the water to be discharged after treatment from the water-treatment cartridge 3. In preferred embodiments with at least one partition in the inlet channel 6 and/or the outlet channel 7, respectively, as described above, such at least one partition cooperates with the terminating means 19 and/or terminating means 20, respectively, assisting the opening of the terminating means 19, 20, improving the flow of water into the cartridge 3 for treatment and/or out of the cartridge 3 after treatment.

In a preferred embodiment of the invention comprising a venting system, as described above, the water-treatment device 1 system is vented by pressing the vent button.

Following installation of the water-treatment cartridge 3 in the water-treatment device 1, it is substantially immovable relative to the head 2 of the device 1, that is, it cannot move out and into the head 2 or rotate relative to the head 2. In other words, the neck 5 of the water-treatment cartridge 3 does not move axially in the seat 4 of the head 2 and substantially does not rotate therein. The one possible position in which the water-treatment cartridge 3 is oriented to the head 2 of the water-treatment device 1, as described above, is defined respectively by the relative position of the orientating means 10 relative to the inlet channel 6 on the body of the water-treatment cartridge 3 and the relative position of the determining means 21 relative to the port 11 of the head 2 of the water-treatment device 1.

Thus, installation of the water-treatment cartridge 3 in the head 2 of the water-treatment device 1, as described above, consists practically in inserting the neck 5 of the water-treatment cartridge 3 into the seat 4 of the head 2 of the water-treatment device 1 until the coupling of the mounting means 17 of the cartridge 3 with the coupling means 22 of the mounting mechanism of the head 2 of the device and until the coupling of the orientating means 10 of the water-treatment cartridge 3 with the determining means 21 of the head 2 of the device while orienting the water-treatment cartridge 3 in the head 2 of the water-treatment device 1 in the position, as described above in detail. Alternatively, before or during inserting the cartridge 3 into the head 2 of the device 1, as described above, it may be necessary to rotate the water-treatment cartridge 3 around its longitudinal axis in order to orient the orientating means 10 of the water-treatment cartridge 3 with the determining means 21 on the head 2 of the device for their engaging, as described above.

When it is necessary to uninstall or replace the water-treatment cartridge 3, for example, as a result of a damage, loss of its water-treatment properties, as described above, one should activate the releasing means 23, for example, as in one of the preferred embodiments, as shown in FIGS. 4 and 8, by pressing the cartridge replacement button in order to release the coupling means 22 in the head 2 from the mounting means 17 of the water-treatment cartridge 3 and to remove the water-treatment cartridge 3 from the head 2 of the water-treatment device 1.

In a preferred embodiment of the head 2 of the water-treatment device, comprising the terminating means 19, 20, during removal of the water-treatment cartridge 3 from the head 2 of the water-treatment device 1, the terminating means 19 are activated of the port 11 of the head 2 of the water-treatment device 1, thus terminating the fluid communication for feeding water from the port 11 to the seat 4 of the device 1 and the terminating means 20 are activated of the port 12 of the head 2 of the water-treatment device 1, thus terminating the fluid communication for water which could return to the seat 4 of the head 2 of the water-treatment device 1. This prevents the flooding the environment in which the water-treatment device 1 is located while removing or after removing the water-treatment cartridge 3 from the device 1, that is, when the water-treatment cartridge 3 is being removed from the seat 4 or is no longer in it.

After removing the water-treatment cartridge 3, a new water-treatment cartridge 3 or a reconditioned water-treatment cartridge 3 can be installed, as described above.

Thus, the water-treatment cartridge 3 according to the present invention, the head 2 according to the invention for the water-treatment device 1 and the water-treatment device 1 according to the invention provide technical solutions, i.e., a cartridge, a head and a device allowing a much simpler, easier and faster installation or replacement of the water-treatment cartridge 3 in water-treatment devices, especially in domestic devices for the treatment of tap water, especially in devices installed in confined spaces, such as under sink cabinets, as compared with the known ones.

Based on the above disclosure, it will be clear to a specialist that certain technical aspects may be realized in many different ways. For example, the cylindrical part 13 can be integrated with the cap 14 to form a uniform body of the water-treatment cartridge 3. Moreover, the water-treatment device 1 can comprise more than one head 2. Depending on the needs, the water-treatment device 1 can comprise two, three or more heads 2 in which the same or different water-treatment cartridges 3 can be installed, that is, cartridges 3 performing the same or different water treatments, as described above in detail. A specialist will know that these two or more heads 2 may be connected in series to perform a subsequent treatment or in parallel to perform a water co-treatment.

The invention is described above with respect to the preferred embodiments by way of example only. Based on the above disclosure, a specialist will recognize that modifications, variants or equivalents are possible falling within the spirit and inventive intention of the present invention, and without exceeding the scope of the attached claims.

The features indicated in the embodiments of the invention described above, especially in the preferred embodiments of the present invention, can be combined or replaced to any extent and in any configurations, whereby all new possible combinations or configurations are deemed fully disclosed in the description of the present invention.

LIST OF ELEMENTS

1 Water-treatment device
2 Head of the water-treatment device 1
3 Water-treatment cartridge
4 Seat of the head 2 of the water-treatment device 1
5 Neck of the water-treatment cartridge 3
6 Inlet channel for feeding water for treatment to the water-treatment cartridge 3
7 Outlet channel for discharging water after treatment from the water-treatment cartridge 3
8 First bed for the first water treatment
9 Second bed for the second water treatment
10 Orientating means on the body of the water-treatment cartridge 3
11 Port for feeding water for treatment to the water-treatment cartridge 3
12 Port for discharging water after treatment from the water-treatment cartridge 3
13 Cylindrical part of the body of the water-treatment cartridge 3
14 Cap of the cylindrical part 13 of the water-treatment cartridge 3
15 Water-treatment cartridge 3 chamber
16 Conduit for discharging water after treatment from the bottom of the chamber 15 of the water-treatment cartridge 3

17 Mounting means of the water-treatment cartridge 3
18 Sealing means of the water-treatment cartridge 3
19 Terminating means of the port 11 for feeding water to the head 2
20 Terminating means of the port 12 for discharging water from the head 2
21 Determining means on the head 2 of the water-treatment device 1
22 Coupling means of the mounting mechanism of the head 2
23 Means for releasing the mounting mechanism of the head 2

The invention claimed is:

1. A water-treatment cartridge for a water-treatment device, wherein the water-treatment device comprises a head comprising a feed port for feeding water for treatment to the water-treatment cartridge and a discharge port for discharging water after treatment from the water-treatment cartridge, wherein the water-treatment cartridge comprises:
a body comprising:
a cylindrical part,
a bottom closing the cylindrical part at one end of said cylindrical part,
a cap mounted at another end of the cylindrical part of the water-treatment cartridge, wherein an inner chamber of the water-treatment cartridge comprises the cylindrical part, the bottom and the cap together,
a neck arranged in a central portion of the cap, the neck extending outside of the body and being oriented along a longitudinal axis of the water-treatment cartridge,
an inlet channel arranged on the neck in fluid communication with the feed port of the head to feed water for treatment to the water-treatment cartridge,
an outlet channel arranged on the neck in fluid communication with the discharge port to discharge water after treatment from the water-treatment cartridge,
at least one water-treatment bed arranged in the inner chamber of the water-treatment cartridge and in fluid communication with the inlet channel for feeding water for treatment and in fluid communication with the outlet channel for discharging water after treatment,
an orientating structure arranged along a longitudinal direction on the cap radially with respect to a longitudinal axis of the water-treatment cartridge and disposed on an outermost peripheral edge of the cap to position the water-treatment cartridge in fluid communication with the head to allow a flow of the water for treatment from the feed port of the head to the inlet channel when the water-treatment cartridge is installed in the head of the water-treatment device.

2. The water-treatment cartridge according to claim 1, wherein the outlet channel is arranged on an upper surface of the neck that is adjacent to the head when the head is seated on the water-treatment cartridge, whereas the inlet channel is arranged on the side wall of the neck of the body of the water-treatment cartridge.

3. The water-treatment cartridge according to claim 1, wherein the at least one water-treatment bed comprises a single water-treatment bed.

4. The water-treatment cartridge according to claim 1, wherein the at least one water-treatment bed comprises a first bed for the first treatment of water and a second bedfor the second treatment of water, wherein the first bed is in a fluid communication with the inlet channel for feeding water for treatment, while the second bed is in a fluid communication with the first bed for the first treatment of water and the outlet channel for discharging water after treatment.

5. The water-treatment cartridge according to claim 3, wherein the water-treatment beds are selected independently from a filtering bed, a water hardness adjustment bed, a water-enrichment bed, a water pH adjustment bed and a biological treatment bed.

6. A head of a water-treatment device for receiving a water-treatment cartridge comprising:
a body comprising:
a cylindrical part,
a bottom closing the cylindrical part at one end of said cylindrical part,
a cap mounted at another end of the cylindrical part of the water-treatment cartridge,
wherein an inner chamber of the water-treatment cartridge comprises the cylindrical part, the bottom and the cap,
a neck arranged in a central portion of the cap, the neck extending outside of the body and being oriented along a longitudinal axis of the water-treatment cartridge,
an inlet channel arranged on the neck for feeding water for treatment to the water-treatment cartridge, and
an outlet channel arranged on the neck for discharging water after treatment from the cartridge,
wherein the head of the water-treatment device comprises:
a seat in the form of a cavity,
a feed port arranged in the seat in fluid communication with the inlet channel of the water-treatment cartridge to feed water for treatment to the water-treatment cartridge, and
a discharge port arranged in the seat in fluid communication with the outlet channel of the water-treatment cartridge to discharge water after treatment from the water-treatment cartridge, and
a determining structure arranged radially with respect to a longitudinal axis of the head and at an outermost peripheral rim of the head to position the head in fluid communication with the water-treatment cartridge to allow a flow path of the water for treatment from the feed port-of the head to the inlet channel when the water-treatment cartridge is installed in the head of the water-treatment device.

7. The head of the water-treatment device according to claim 6, wherein the feed port for feeding water for treatment to the water-treatment cartridge is arranged on a side wall of the seat, and the discharge port for discharging water after treatment from the water-treatment cartridge has a first end arranged at a bottom portion of the seat that is adjacent to the head when the head is inserted in the seat and a second end arranged in the side wall of the seat.

8. A water-treatment device comprising:
a head comprising
a seat in the form of a cavity,
a feed port arranged in the seat for feeding water for treatment,
a discharge port arranged in the seat for discharging water after treatment, and
a determining structure,
a water-treatment cartridge comprising:
a body comprising:
a cylindrical part, a bottom closing the cylindrical part at one end of said cylindrical part, a cap mounted at another end of the cylindrical part of the water-treatment cartridge, wherein an inner chamber of the water-treatment cartridge comprises the cylindrical part, the bottom and the cap, a neck arranged in a central portion of the cap, the neck extending outside of the body and being oriented along a longitudinal axis of the water-treatment cartridge, an inlet channel arranged on the neck in fluid communication with the feed port of the head to feed water for treatment to the water-treatment cartridge, an outlet channel arranged on the neck in fluid communication with the discharge port for discharging water after treatment from the water-treatment cartridge, at least one water-treatment bed arranged in the inner chamber of the water-treatment cartridge and in fluid communication with the outlet channel for feeding water for treatment and in fluid communication with the outlet channel for discharging water after treatment, an orientating structure arranged along a longitudinal direction on the cap radially with respect to a longitudinal axis of the water-treatment cartridge and at an outermost peripheral rim of the cap and a determining structure of the head arranged radially with respect to the longitudinal axis of the head and at an outermost periphery of the head, the orientating structure cooperating with the determining structure to position the water-treatment cartridge in fluid communication with the head to allow a flow of water through the inlet channel when the water-treatment cartridge is installed in the head of the water-treatment device.

9. The water-treatment device according to claim 8, wherein the feed port for feeding water for treatment is arranged on a side wall of the seat, the discharge port for discharging water after treatment has a first end arranged at a bottom of the seat that is adjacent to the head when the head is inserted in the seat and a second end arranged in the side wall of the seat, the outlet channel is arranged correspondingly on an upper surface of the neck that is adjacent to the head when the head is seated on the water-treatment cartridge, and the inlet channel correspondingly is arranged on the side wall of the neck of the body of the water-treatment cartridge.

10. The water-treatment device according to claim 8, wherein the water-treatment cartridge comprises a single water-treatment bed.

11. The water-treatment device according to claim 8, wherein the water-treatment cartridge comprises a first bed for the first treatment of water and a second bed for the second treatment of water, wherein the first bed is in fluid communication with the inlet channel for feeding water for treatment, and the second bed is in fluid communication with the first bed for the first treatment of water and the outlet channel for discharging water after treatment.

12. The water-treatment device according to claim 10, wherein the water-treatment beds are selected independently from a filtering bed, a water hardness adjustment bed, a water-enrichment bed, a water pH adjustment bed and a biological treatment bed.

13. The water-treatment device according to claim 12, wherein the first water-treatment bed is a water-hardness adjustment bed, and the second water-treatment bed is a filtering bed.

14. The water-treatment device according to claim 8, wherein the orientating structure is a protrusion arranged radially near the neck of the water-treatment cartridge, and the determining structure on the head is a notch.

15. The water-treatment cartridge according to claim 1, wherein the longitudinal orientating structure is a protrusion.

16. The water-treatment cartridge according to claim 1, wherein the longitudinal orientating structure is a notch.

17. The head according to claim 6, wherein the determining structure is a protrusion.

18. The head according to claim 6, wherein the determining structure is a notch.

19. The water-treatment device according to claim 8, wherein the determining structure for the head is a notch and the longitudinal orientating structure of the water-treatment cartridge is a protrusion.

20. The water-treatment device according to claim 8, wherein the determining structure for the head is a protrusion and the longitudinal orientating structure of the water-treatment cartridge is a notch.

* * * * *